United States Patent
Swamy

(10) Patent No.: US 9,099,935 B2
(45) Date of Patent: Aug. 4, 2015

(54) SINGLE-PHASE ACTIVE FRONT END RECTIFIER SYSTEM FOR USE WITH THREE-PHASE VARIABLE FREQUENCY DRIVES

(71) Applicant: Yaskawa America, Inc., Waukegan, IL (US)

(72) Inventor: Mahesh M. Swamy, Gurnee, IL (US)

(73) Assignee: Yaskawa America, Inc., Waukegan, IL (US)

( * ) Notice: Subject to any disclaimer, the term of this patent is extended or adjusted under 35 U.S.C. 154(b) by 139 days.

(21) Appl. No.: 13/740,776

(22) Filed: Jan. 14, 2013

(65) Prior Publication Data

US 2014/0198542 A1    Jul. 17, 2014

(51) Int. Cl.
*H02M 7/06* (2006.01)
*H02M 1/42* (2007.01)
*H02M 1/00* (2007.01)

(52) U.S. Cl.
CPC .... *H02M 1/4225* (2013.01); *H02M 2001/0003* (2013.01); *H02M 2001/008* (2013.01); *Y02B 70/126* (2013.01)

(58) Field of Classification Search
CPC ......... H02M 1/12; H02M 1/32; H02M 5/458; H02M 5/4505; H02M 5/4585; H02M 7/7575; H02M 7/06; H02M 7/068; H02M 7/10
USPC .............. 363/34, 37, 123, 125, 126, 131, 132
See application file for complete search history.

(56) References Cited

U.S. PATENT DOCUMENTS

| | | | | |
|---|---|---|---|---|
| 5,646,498 | A * | 7/1997 | Lipo et al. | 318/800 |
| 6,930,899 | B2 * | 8/2005 | Bakran et al. | 363/132 |
| 7,990,097 | B2 * | 8/2011 | Cheng et al. | 318/800 |
| 8,730,696 | B2 * | 5/2014 | Barbosa | 363/71 |

OTHER PUBLICATIONS

Kim et al. "Condition Monitoring of DC-link Capacitors in Drive System for Electric Vehicles". IEEE Vehicle Power and Propulsion Conference. Oct. 9-12, 2012. Seoul, Korea. pp. 633-637.*
Euzeli Cipriano dos Santos, Jr. et al., "Single-Phase to Three-Phase Power Converters: State of the Art", in IEEE Transactions on Power Electronics vol. 2, pp. 2437-2452.

* cited by examiner

*Primary Examiner* — Adolf Berhane
*Assistant Examiner* — Kevin H Sprenger
(74) *Attorney, Agent, or Firm* — Wood, Phillips, Katz, Clark & Mortimer

(57) ABSTRACT

A voltage source inverter comprises a rectifier having an input for receiving single-phase AC power from an AC source and converting the AC power to DC power on a DC bus. The DC bus has first and second rails to provide a relatively fixed DC voltage. A DC bus capacitor is across the first and second rails to smooth voltage ripple. An inverter receives DC power from the DC bus and converts the DC power to AC power. An active front end circuit comprises a pair of filter capacitors in series across the first and second rails to create a midpoint. A bidirectional switch is connected between the rectifier input and the midpoint. The bidirectional switch is controlled to inject current into the midpoint of the DC bus.

18 Claims, 7 Drawing Sheets

SINGLE-PHASE ACTIVE FRONT END RECTIFIER SYSTEM FOR USE WITH THREE-PHASE VARIABLE FREQUENCY DRIVES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to variable frequency drives and, more particularly, to an improved single-phase active front end rectifier system for use with three-phase variable frequency drives.

BACKGROUND

Voltage source inverter based variable frequency drives (VFDs) have an AC to DC rectifier unit with a large DC capacitor to smooth the voltage ripple. In all VFDs, the DC bus voltage is inverted to three-phase variable voltage, variable frequency output to control the speed and torque of three-phase AC motors. For loads rated above 2 hp, it is customary and often required to power up the AC to DC rectifier section from a three-phase AC source. However, the input AC to DC rectifier can be powered up from a single-phase AC source, especially in locations where three-phase AC power is unavailable due to logistics and other reasons. In such cases, some utilities allow three-phase VFDs to be powered from a single-phase AC source provided the peak current flowing into the AC to DC rectifier system is within the rating of the single-phase AC source. Many VFD manufacturers impose restrictions on the rating of the VFD when they are subject to a single phase AC source.

There exist important concerns while operating a three-phase VFD from a single-phase AC source. These include that the RMS value of the input AC current is at least two times that when a three-phase supply is used for a given load. The input diodes have to handle the higher demand current for a given load. De-rating of the inverter is undertaken to address this concern. Higher input current affects the input AC power terminal blocks. In many cases, the diodes may be able to handle the higher values of RMS current but the terminal blocks may not be rated to handle the peak current on a continuous basis. Input harmonic distortion is high when single-phase input is used as an AC source for a three-phase inverter. Poor harmonics is also associated with lower input power factor. This affects the efficiency of power conversion and should be considered in any proposed improvements. Single-phase AC supply results in higher ripple voltage across the DC bus. Higher ripple voltage translates to higher ripple current through the capacitor and more heating of the capacitor. The inverter is typically de-rated to handle the higher ripple current. The current drawn from the single-phase AC source feeding a three-phase VFD is discontinuous. When the pulsed current flows from the AC source, it creates voltage drop that mimics the pulsed current waveform to some extent. The resulting voltage drop can affect other loads connected to the same AC source.

There are many known techniques, both passive and active, that are employed to improve the current waveform and reduce the overall current harmonics. The active techniques have an advantage over the passive techniques in size and performance. The cost of certain type of active techniques can be higher than passive techniques.

One known passive approach creates a resonant circuit across the DC bus. Energy is stored in the resonant components and released naturally at the appropriate time to support the sagging DC bus voltage and thereby reduce the ripple across the bulk capacitors of the DC bus. The topology is shown in FIG. 1 and its operation is described below.

The DC bus resonant method adds a resonant circuit across the DC bus as shown in FIG. 1. The resonance frequency of the resonant inductor $L_1$ and resonant capacitor $C_1$ of the resonant circuit across the DC bus is two times the supply frequency (100 Hz in Asia, Europe and Africa, and 120 Hz in North and South America). A DC link inductor $L_2$ is placed in between the resonant circuit and the main bus capacitor $C_2$ to decouple the main DC bus capacitor from the resonant circuit so as not to detune the main resonant circuit. It also helps in reducing the current ripple of the bus capacitor $C_2$. The value of $L_2$ is about ⅓ the value of $L_1$ and the value of $C_1$ is typically ⅓rd to ¼th fourth the main capacitor, $C_2$.

When the instantaneous voltage across the resonant circuit $L_1$-$C_1$ is lower than the line-line voltage of the AC supply, the input diodes conduct and charge the resonant circuit $L_1$-$C_1$ and the DC bus filter capacitor $C_2$. Because of the resonant circuit, the input diodes remain in conduction for one-half of the resonant cycle, even when the voltage across the resonant circuit $L_1$-$C_1$ is higher than the instantaneous input line-line voltage. The input diode conduction duration is extended because the charging current keeps flowing into the resonant circuit and into the main DC bus capacitor $C_2$.

When the resonant current tries to reverse its polarity and flow in the opposite direction, the input diodes are shut off and they cease to conduct. The energy stored in the resonant circuit $L_1$-$C_1$ is transferred to the load thereby reducing the ripple current through the DC bus capacitor $C_2$. This action limits the DC bus ripple voltage and extends the life of the DC bus capacitor $C_2$. During this time, the DC bus filter capacitor $C_2$ also discharges into the load, which is evident from the drooping DC bus voltage characteristics. The value of $L_1$, $C_1$, and $L_2$ are chosen such that the resonant period when the input diodes are conducting and charging $L_1$-$C_1$ path is similar to the resonant period when the input diodes are not conducting and the energy in $L_1$-$C_1$ is being transferred to $C_2$ via $L_2$. Advantages of the DC bus resonance method are that extending the diode conduction period during the charging cycle reduces the input harmonics and improves the input power factor to some extent, and the DC bus capacitor ripple is significantly reduced.

The passive resonant circuit shown in FIG. 1 has disadvantages as well. Resonant components are bulky and expensive. The DC bus circuit needs to be accessed in some VFDs that do not have a built-in DC link choke, $L_2$. The peak diode current is reduced but the improvement is not conspicuous. Also, average DC bus voltage is still low and the VFDs need to be de-rated though the level of de-rating is smaller than that without the DC bus resonant circuit.

To improve the overall performance, an active solution commonly used in single-phase AC to DC power supplies uses a boost converter that boosts the input voltage to a desired DC bus voltage level under all load conditions. The overall DC bus voltage ripple is also reduced. An added advantage is that the input current is made continuous which reduces the input current harmonic distortion. The active circuit is shown in FIG. 2.

When the switch S1 is turned ON, current from the AC source flows into the inductor L1. During this period, energy is stored in the inductor L1. When the switch S1 is turned OFF, the inductor current cannot stop flowing immediately because of the nature of inductance. The voltage across the inductor L1 forward biases the blocking diode and all its stored energy is transferred to the DC bus capacitor and the load. The switching ON and OFF of the switch S1 takes place very rapidly in kHz range and hence the output DC bus voltage is effectively regulated thereby reducing both the ripple voltage and the ripple current through the capacitor.

As shown in FIG. 2, the boost converter requires a DC link inductor for the boosting action, a switch, and a blocking diode. The main DC bus capacitor is part of the load. The control circuit takes care of the operation of the boost converter by switching the IGBT switch. The schemes developed for the control of the boost converter topology involve maintaining a regulated DC bus voltage with low ripple and simultaneously enabling unity-power-factor operation with continuous input current for the entire load range as mentioned earlier.

The relationship between the output and input voltage can be derived as follows. The output voltage is a function of the duty cycle 'α' of the switch. The relationship between the average output voltage $V_{DC}$ and the average input voltage $V_1$ in terms of the duty cycle 'α' is derived next. If the switch S1 is ON for a time $t_{ON}$ and has a cycle duration of T, then duty cycle 'α' is defined as:

$$\alpha = \frac{t_{ON}}{T} \quad (1)$$

Since the average voltage across the inductor is zero, the following expression is true:

$$(\alpha T \cdot V_1) + ((1-\alpha)T \cdot (V_1 - V_{DC})) = 0 \quad (2)$$
$$\alpha = 1 - \frac{V_1}{V_{DC}}$$

The average output voltage $V_{DC}$ in terms of the average input voltage $V_g$ and duty ratio 'α' is given as:

$$V_{DC} = \frac{V_1}{1-\alpha} \quad (3)$$

When the duty ratio 'α' is zero, then the average output voltage is the same as the average input voltage because the switch S1 is not being utilized. If the duty ratio 'α' is 1, then the output voltage can theoretically go to infinity, which is impractical.

Average DC bus voltage control philosophy is employed. A set voltage reference is compared with the DC bus voltage that is actually sensed from across the DC bus. The error is fed through a proportional-integral (PI) controller. The output of the PI controller forms the gain, which is multiplied by the non filtered rectified voltage at the output of the single-phase rectifier. The shape of this gain manipulated rectified voltage is the desired inductor current. The DC link current through the boost inductor is also sensed and is compared with this current reference. The error is fed through another PI controller, the output of which is compared with a high frequency saw-tooth carrier frequency waveform. The comparator has a built-in (non-adjustable) hysteresis. The output of the hysteresis comparator is fed into the gate driver. The output of the gate drive circuit is used to control the switching action of the boost IGBT.

From the discussions thus far, the advantages and disadvantages of the boost converter can be summarized as follows. The input current is sinusoidal and has low harmonic distortion, thereby eliminating the peak current stress in the input diodes. The input power factor is very good and results in lower thermal loss in the AC system. The ripple voltage across the capacitor is reduced but still is conspicuous. The boost switch (S1 in FIG. 2), has to be rated to carry peak of input current and also has to handle the boosted voltage. Hence, the stress across the switch S1 is large making it expensive. Switching noise is observed in the input AC voltage waveform. This means that input EMI filter is needed to limit noise from propagating into the AC source. No de-rating of VFD is needed and VFD can be operated at its rated power condition.

The present invention is directed to improvements in single-phase front end rectifier systems.

SUMMARY

In accordance with the invention a voltage source inverter includes a single-phase active front end rectifier system for use with three-phase variable frequency drives.

Broadly, in accordance with one aspect of the invention, a voltage source inverter comprises a rectifier having an input for receiving single-phase AC power from an AC source and converting the AC power to DC power on a DC bus. The DC bus has first and second rails to provide a relatively fixed DC voltage. A DC bus capacitor is across the first and second rails to smooth voltage ripple. An inverter receives DC power from the DC bus and converts the DC power to AC power. An active front end circuit comprises a pair of filter capacitors in series across the first and second rails to create a midpoint. A bidirectional switch is connected between the rectifier input and the midpoint. The bidirectional switch is controlled to inject current into the midpoint of the DC bus.

It is a feature of the invention that the bidirectional switch is turned on for the first half of each half wave cycle of the single-phase AC power.

It is another feature of the invention that the bidirectional switch comprises two switches connected in a common emitter configuration.

It is a further feature of the invention that first and second inductors connected between opposite sides of the AC source and the rectifier. The first and second inductors may be of equal inductance. The first and second inductors may each have an impedance of about 0.1 pu.

It is an additional feature of the invention that the DC bus capacitor comprises an electrolytic capacitor and the filter capacitors comprise film capacitors.

It is still another feature of the invention that the filter capacitors are about 0.15 pu of the main DC bus capacitors.

It is a feature of the invention that the rectifier comprises a three-phase rectifier bridge including three pairs of diodes and the bidirectional switch is connected to one pair of diodes of the rectifier bridge and the two other pairs of diodes of the rectifier bridge are shorted to provide current sharing between the two other pairs of diodes.

It is another feature of the invention that the rectifier comprises a three-phase rectifier bridge including three pairs of diodes and the bidirectional switch is connected to one pair of diodes of the rectifier bridge and the two other pairs of diodes of the rectifier bridge are connected in parallel to provide current sharing between the two other pairs of diodes.

There is disclosed in accordance with another aspect of the invention a boost converter comprising a rectifier having an input for receiving single-phase AC power from an AC source and converting the AC power to DC power on a DC bus. The DC bus has first and second rails to provide a relatively fixed DC voltage. A DC bus capacitor is across the first and second rails to smooth voltage ripple. An active front end circuit comprises a pair of filter capacitors in series across the first and second rails to create a midpoint. A bidirectional switch is connected between the rectifier input and the midpoint. The bidirectional switch is controlled to inject current into the midpoint of the DC bus to provide a regulated DC source.

Other features and advantages will be apparent from a review of the entire specification, including the appended claims and drawings.

DETAILED DESCRIPTION

Figure 1:
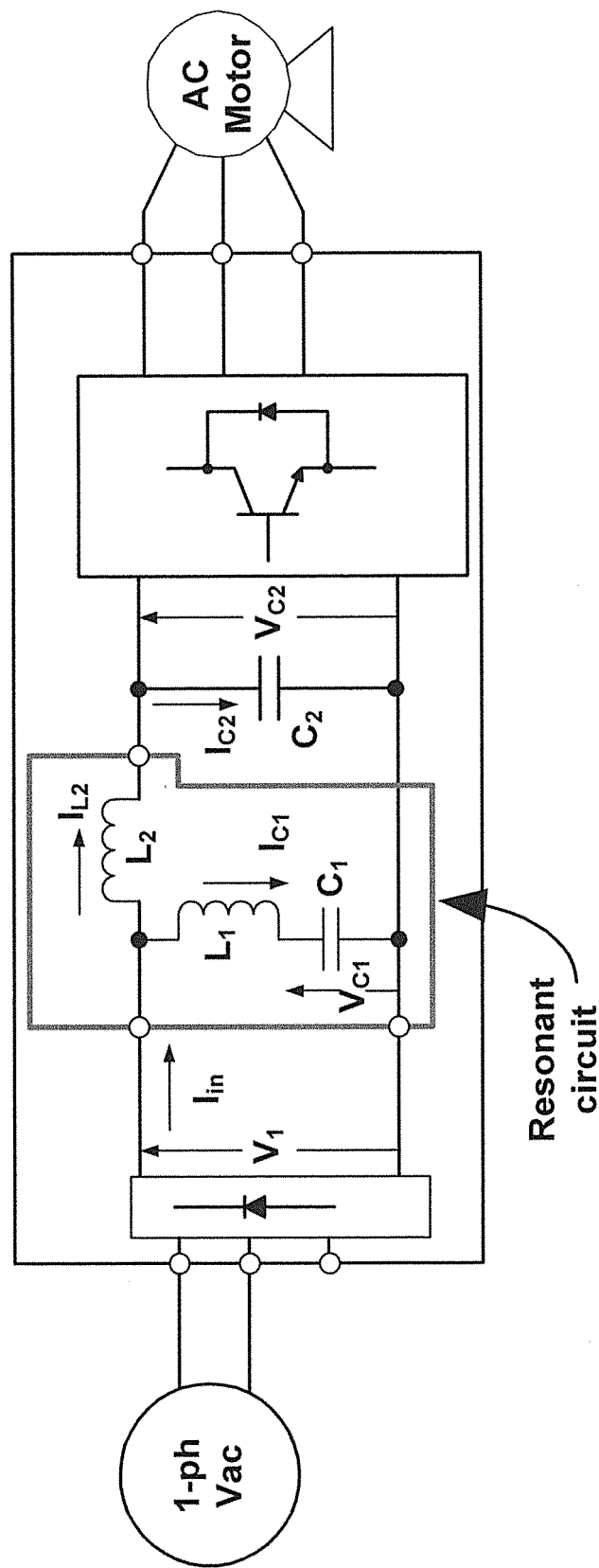
FIG. 1 is an electrical schematic for a prior art VFD with a DC bus resonant circuit.
Figure 2:
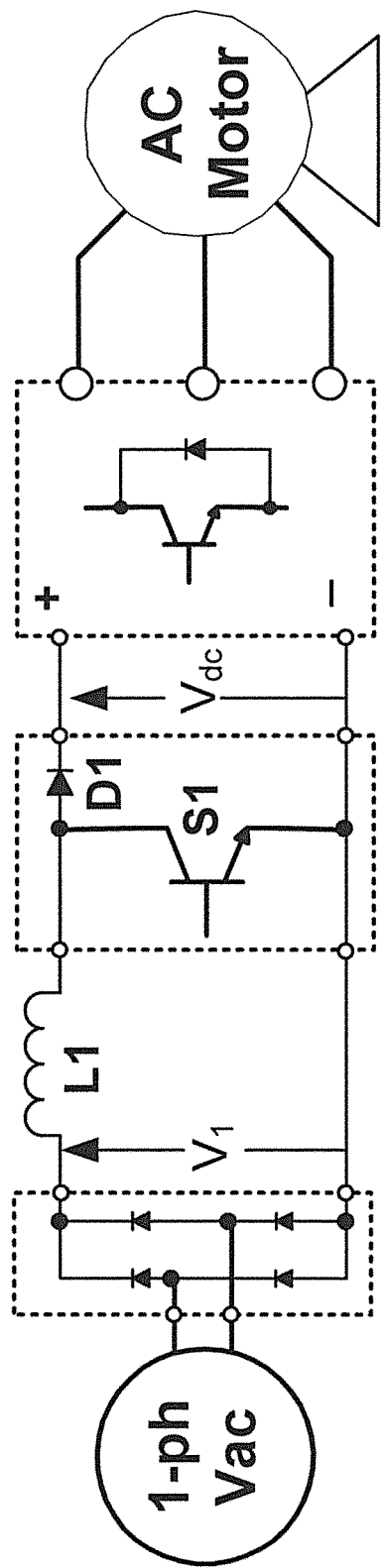
FIG. 2 is an electrical schematic for a prior art VFD with a boost converter.
Figure 3A:
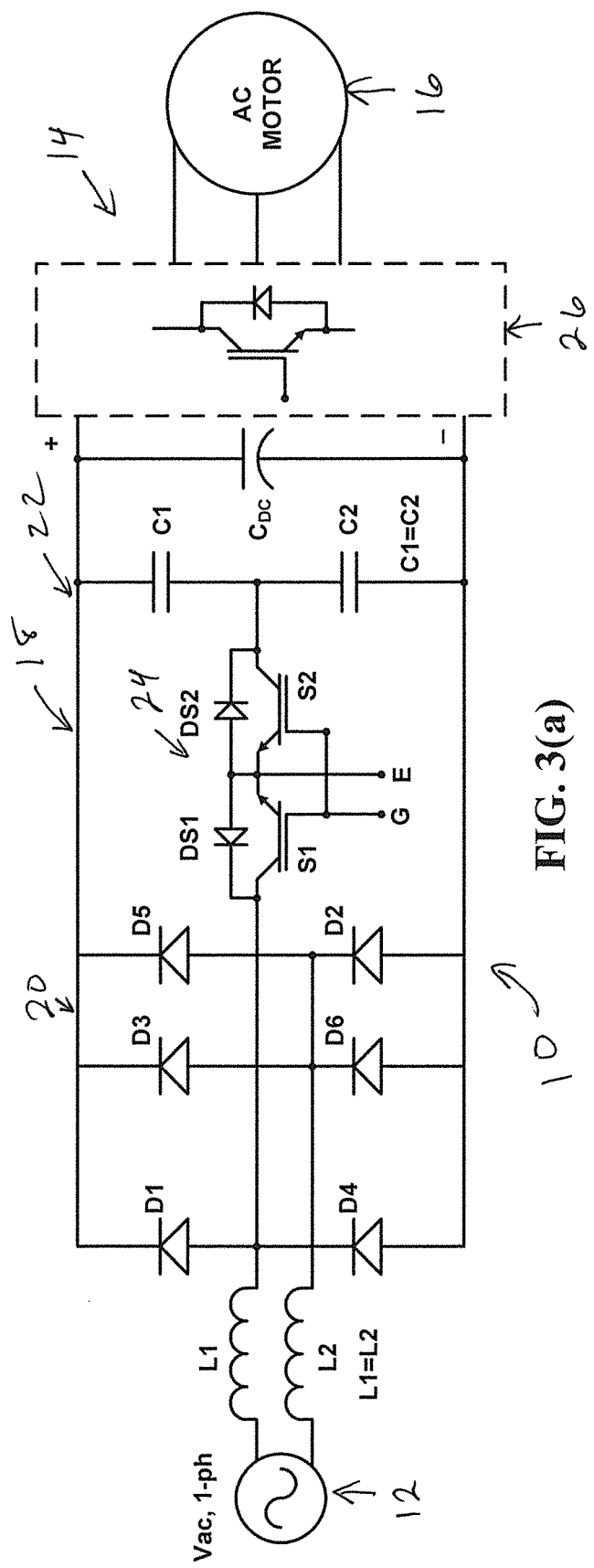
FIG. 3(a) is an electrical schematic for a VFD including a single-phase active front end circuit in accordance with the invention.

Many active techniques have been researched to address the problem of powering up a three-phase VFD from a single-phase AC source. This application describes a low cost single-phase active circuit that is based on injecting current into the midpoint of the DC bus capacitor employing a bidirectional switch as shown in FIG. 3. The topology disclosed here employs bidirectional switches that are rated only to handle the charging current for a maximum of a quarter period of the input voltage cycle. This current is typically only about 50% of the rated current of the AC to DC rectifier. The topology also lends itself easy for integration with the drive. The circuit of FIG. 3 does not support regeneration. Since most HVAC applications do not need regeneration, there is no strong desire to propose the fully regenerative active front end converter system, which is bulkier, more expensive, and occupies large space.

The topology shown in FIG. 3 is a single-phase partial boost converter that forces current conduction even during the time when the input AC voltage is lower than the DC bus voltage. This is possible since the voltage is applied across the phase and the DC bus midpoint. The current flow is limited by an external inductor, which behaves like a boost inductor boosting the main DC bus voltage when the switch is forced to turn off at sometime near to the peak of input AC voltage. The boost inductor is large in size since the charging cycle occurs only twice every input cycle. In other words, the switching frequency is only two times the supply frequency (100 Hz for a 50 Hz AC source and 120 Hz for a 60 Hz AC source). Low switching frequency helps in avoiding the need to employ additional EMI filtering in the input.

Referring to FIG. 3, a motor drive system 10 is illustrated. The motor drive system 10 receives power from an AC source 12 and includes a variable frequency drive (VFD) 14 configured as a voltage source inverter for driving an induction motor 16. As is known, a control unit (not shown) would be used for controlling the VFD 14. However, such a control unit is not shown herein as it does not itself form part of the invention. Instead, the invention is particularly directed to a single-phase active front end circuit 18, as described below.

The AC source 12 may comprise a conventional single-phase AC supply. The active front end circuit 18 includes a three-phase bridge rectifier 20 comprising three parallel diode pairs, D1-D4, D3-D6 and D5-D2, connected between first and second rails + and − forming a DC bus 22. The AC source 12 is input to the rectifier 20 by first and second external inductors L1 and L2. The first inductor L1 is connected between the high side of the AC source 12 and the junction of the first diode pair D1-D4 and a bidirectional switching circuit 24. The second inductor L2 is connected between the low side of the AC source 12 and the junctions of the second and third diode pairs D3-D6 and D5-D2. First and second filter capacitors C1 and C2 are connected in series across the DC bus 22. The opposite side of the bidirectional switching circuit 24 is connected to the junction between the filter capacitors C1 and C2. A DC bus capacitor $C_{DC}$ is also connected across the DC bus 22. The DC bus 22 is connected to an inverter 26. The inverter 26 converts the DC power to AC power, in any known manner, to drive the motor 16.

Figure 3B:
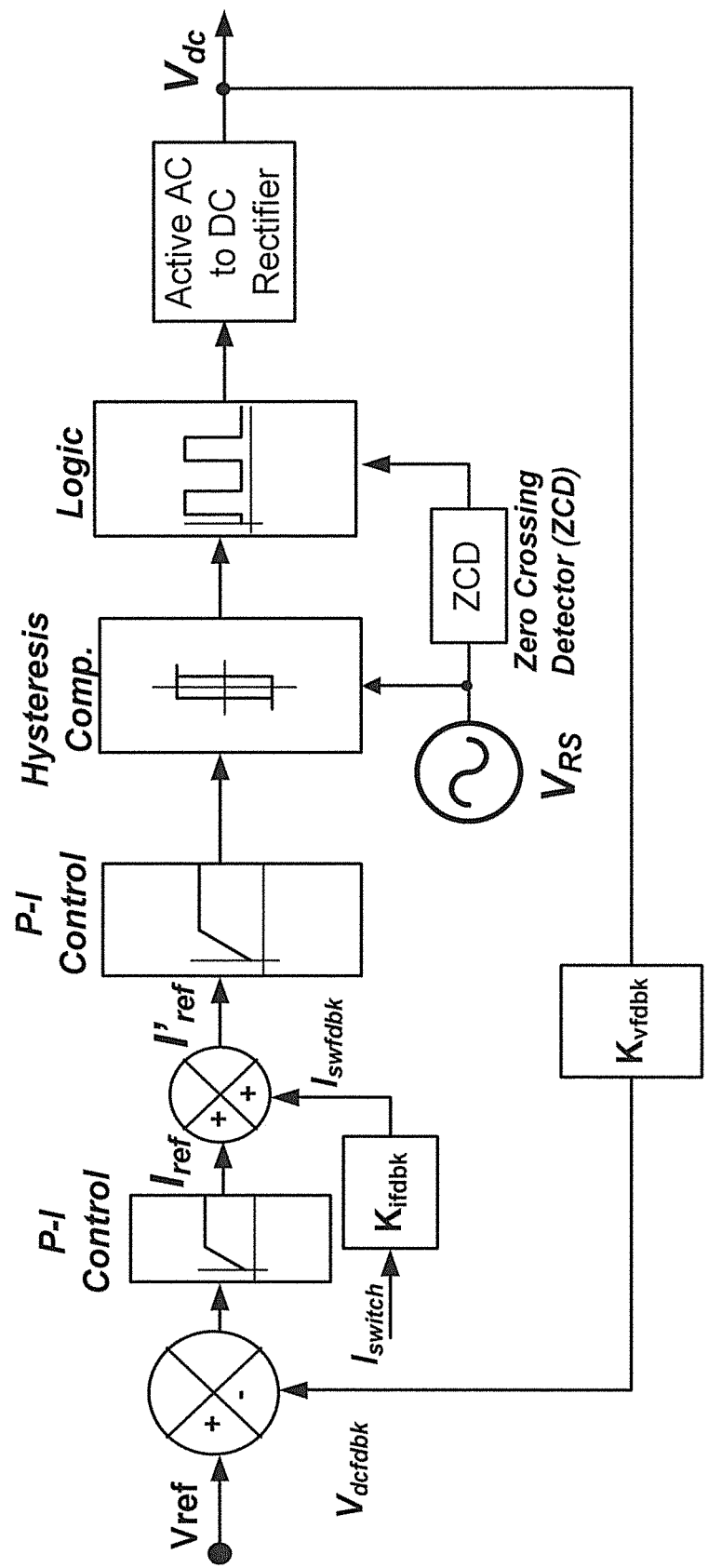
FIG. 3(b) is an exemplary control schematic for controlling the active front end circuit of FIG. 3(a)

The bidirectional switch 24 comprises two switches S1 and S2 connected in a common emitter configuration. The two switches S1 and S2 could also be connected in a common collector configuration. A first freewheeling diode DS1 is connected across the first switch S1. A second freewheeling diode DS2 is connected across the second switch S2. The bidirectional switch 24 channels current from the AC source 12 to the DC bus midpoint in a bidirectional manner. To ensure equal performance in each half of the input AC cycle, two different inductors L1 and L2 of the same value are used in between the AC source 12 and the diode rectifier unit 20. Again, to ensure equal conduction, the filter capacitors C1 and C2 forming the DC bus midpoint are also of same value and same voltage rating. FIG. 3(b) illustrates a block diagram for an exemplary control circuit. The basic operation is described referring to the theoretical waveforms shown in FIG. 4. Two distinct modes of operation are identified here and the description of each mode will help in highlighting the features of the illustrated circuit.

Figure 4:
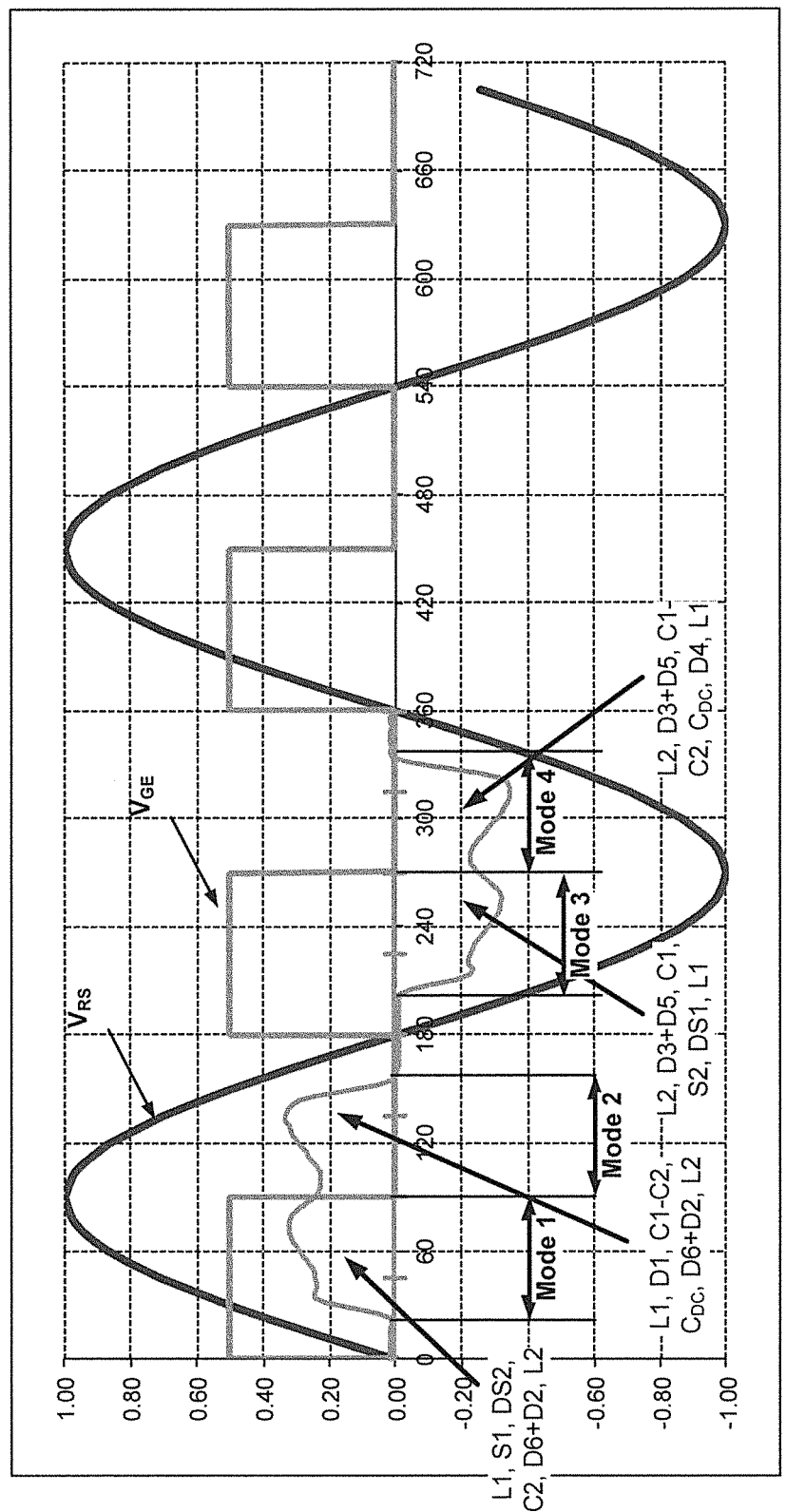
FIG. 4 illustrates waveforms at various points in the circuit of FIG. 3(a)

The bidirectional switch 24 is controlled by a control voltage $V_{GE}$. Curves illustrating the control voltage $V_{GE}$ relative to other voltages are shown in FIG. 4. The input AC voltage $V_{RS}$ is sensed for its zero crossing instances. The DC bus voltage $V_{dc}$ is also sensed and is compared with a reference voltage level $V_{ref}$. The difference or error is fed into a Proportional plus integral (P-I) controller. The output of this P-I controller is compared with the sensed input AC voltage to generate the desired pulse width that starts at every zero crossing, resulting in a 120 Hz switching pattern. Thus, the bidirectional switch 24 is turned on for the first half of each half wave cycle of the single-phase AC input power $V_{RS}$.

The start of mode 1 occurs when the first switch S1 is forward biased and starts to conduct. This happens, when the instantaneous line-line voltage is greater than the DC bus midpoint voltage by voltage drops across the first switch S1 and the second free-wheeling diode DS2. Current linearly increases and is limited by the inductance of the first external inductor L1. Following the path in FIG. 3(a), current is seen to flow through L1, S1, DS2, filter capacitor C2, and returns back through the parallel combination of diodes D6 and D2, into the source via the second external inductor L2. At the end of mode 1, the first switch S1 is turned OFF. The equation for the flow of current through L1 and L2 during mode 1 is as follows:

$$V_m \sin(\omega t) - \frac{V_{DC}}{2} = (L_1 + L_2) \cdot \frac{di}{dt}$$

$$i = \left( \frac{V_m}{\omega \cdot (L_1 + L_2)} \cdot \int_{\pi/6}^{\omega t} \sin(\omega t) \cdot d(\omega t) \right) - \left( \frac{V_{DC}}{2 \cdot \omega \cdot (L_1 + L_2)} \cdot (\omega t - \pi/6) \right)$$

$$i = \frac{V_m}{\omega \cdot (L_1 + L_2)} \cdot \left( \frac{\sqrt{3}}{2} - \cos(\omega t) \right) - \left( \frac{V_{DC}}{2 \cdot \omega \cdot (L_1 + L_2)} \cdot (\omega t - \pi/6) \right);$$

$$\pi/6 \le \omega t \le \pi/2$$

By equating the current at the end of mode 1 to the maximum value of the rated input current for a given power rating, one can compute the value of the input inductor needed to achieve the desired operation. The total combined inductance of $L_1 + L_2$ is represented by $L_{in}$ in the following equations. $Z_{pu}$ is the rated impedance of the system and is defined as the ratio of the rated line-neutral voltage to the rated input current.

$$Z_{pu} = \frac{V_{LL}}{\sqrt{3} \cdot I_L}$$

$$I_m = \frac{V_m}{\omega \cdot L_{in}} \cdot \left( \frac{\sqrt{3}}{2} \right) - \left( \frac{V_{DC}}{2 \cdot \omega \cdot L_{in}} \cdot (\pi/3) \right); \text{ at } \omega t = \pi/2$$

$$\omega \cdot L_{in} = Z_{in} = \frac{V_m}{I_m} \cdot \left( \frac{\sqrt{3}}{2} \right) - \left( \frac{V_{DC}}{I_m} \cdot (\pi/6) \right)$$

$$Z_{in} = \frac{Z_{pu}}{\sqrt{3}} \cdot \left( \frac{\sqrt{3}}{2} \right) - \left( \frac{1.35 \cdot Z_{pu}}{\sqrt{2} \cdot \sqrt{3}} \cdot (\pi/6) \right)$$

$$Z_{in} = Z_{pu} \cdot \left( \frac{1}{2} - \frac{1.35 \cdot \pi}{6 \cdot \sqrt{6}} \right)$$

$$Z_{in} \approx 0.211 \cdot Z_{pu}$$

Since $Z_{in}$ is made up of two equal inductors, $L_1$ and $L_2$, it can be seen that each inductor needs to have an impedance of about 0.1 pu or 10% of the rated impedance of the load reflected onto the AC source.

The start of mode 2 occurs when the first switch S1 is turned OFF. The current through the inductors $L_1$ and $L_2$ cannot stop instantaneously and so the inductor current flows into diode D1, charges up the DC bus 22, supplies energy to the load and returns back through diodes D6 and D2 into the source 12 via the second inductor $L_2$. In other words, during mode 2, the energy in the two inductors L1 and L2 is returned to the DC bus 22 and is used up by the load.

Mode 3 is a repeat of mode 1 with inductors and diodes interchanged. Similarly mode 4 is a repeat of mode 2 with the inductors interchanged.

Figure 5:
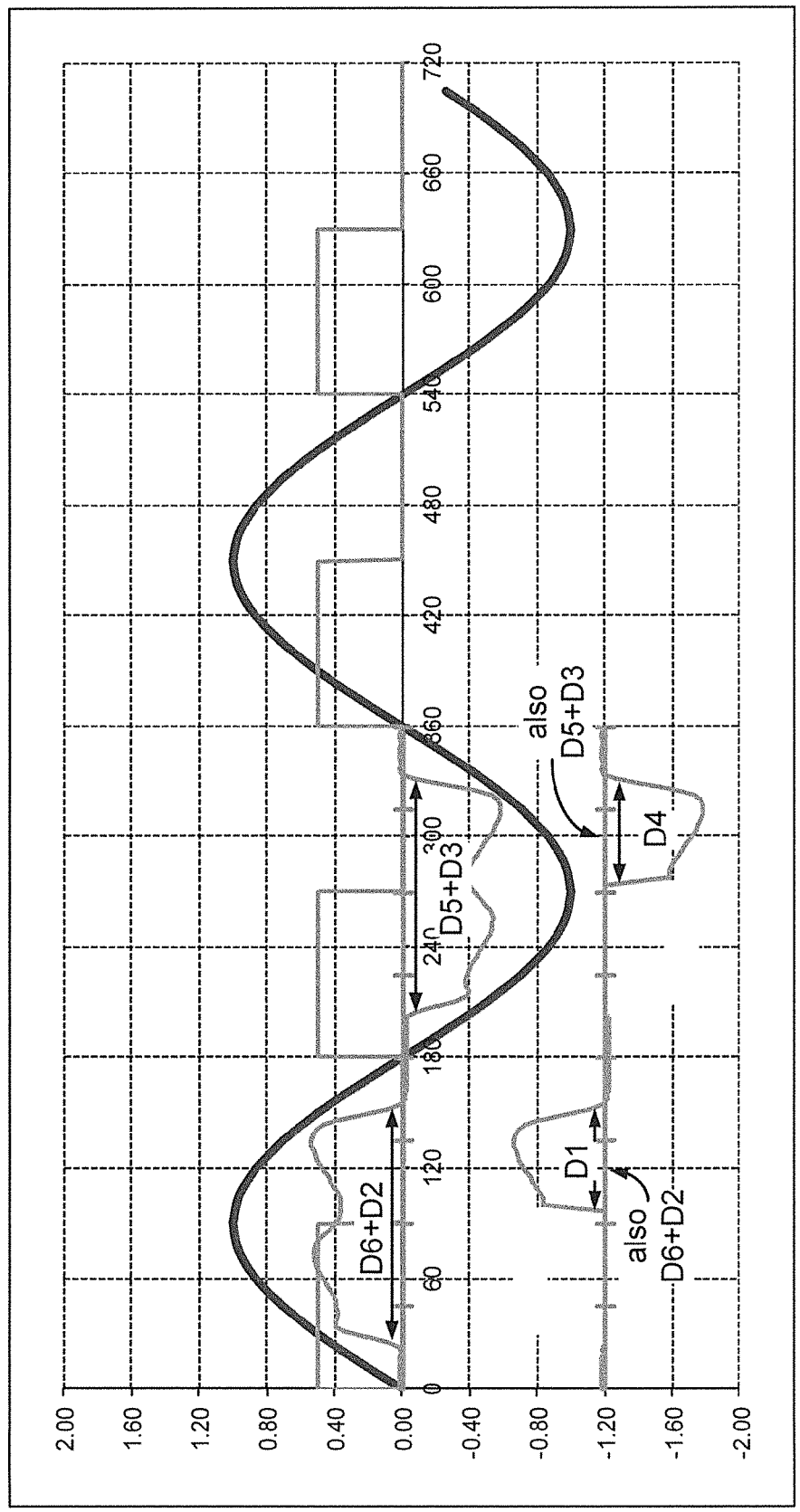
FIG. 5 illustrates diode conduction asymmetry in the circuit of FIG. 3(a)

From the discussions thus far, it is noted that diodes D2 and D6 carry current during both modes 1 and 2 while diode D1 carries current only during mode 2. Similarly, diodes D3 and D5 carry current during both modes 3 and 4 while diode D4 carries current only during mode 4. This is shown in FIG. 5.

Since in most 3-phase VFDs, the input rectifier is a three-phase rectifier bridge and six diodes are available, it is prudent to short two of the input terminals that are not connected to the DC bus midpoint via the bidirectional switch 24. This allows better current sharing between the diodes D2 and D6 and between the diodes D3 and D5. This idea takes full advantage of the availability of the extra pair of diodes present in a typical 3-phase rectifier when used for single-phase applications.

As described earlier, the disclosed circuit uses external capacitors C1 and C2 that form the DC bus midpoint. Since these external capacitors C1 and C2 carry only ripple current, it is not necessary to use electrolytic capacitors. By separating the ripple carrying capacitor from the bulk electrolytic capacitors, there is room for optimization in size and cost. The selection of the value of the capacitor is defined by the energy stored in the boost inductor. This is the same energy that circulates between the boost inductor and each of the filter capacitors C1 and C2. In other words, the energy in the inductor $L_{in}$ should be equated with that across the capacitor $C_1$. The equation for selecting the capacitor is derived as follows:

$$L_{in} \cdot I_m^2 = C_1 \cdot \left( \frac{V_m}{2} \right)^2$$

$$Z_{surge} = \sqrt{\frac{L_{in}}{C_1}} = \frac{V_{in}}{2 \cdot I_{in}}$$

$$\sqrt{\frac{L_{in}}{C_1}} = \frac{\sqrt{3} \cdot Z_{pu}}{2}$$

$$C_1 = \frac{4 \cdot L_{in}}{3 \cdot Z_{pu}^2}$$

$$Z_C = \frac{1}{\omega \cdot C_1} = \frac{3 \cdot Z_{pu}^2}{4 \cdot Z_{in}}$$

$$Z_C \approx 3.554 \cdot Z_{pu}$$

From the above equation, it is evident that value of the filter capacitor C1 is quite small compared to the main DC bus capacitor $C_{DC}$. In most practical cases, tests have shown that the filter capacitor C1 needs to be only about 10 to 15% of the main DC bus capacitor value.

Figure 6:
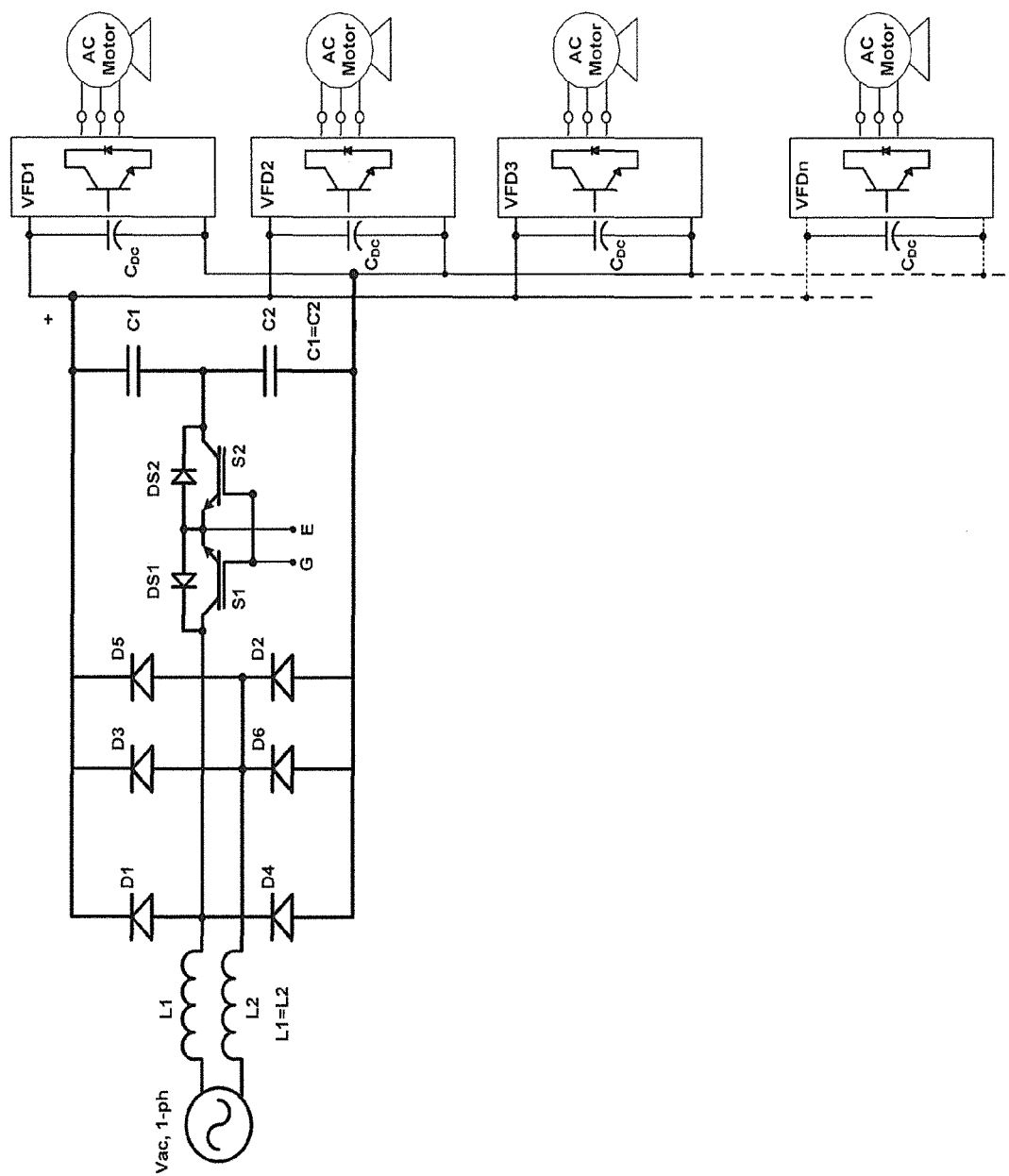
FIG. 6 is an electrical schematic of a common DC bus application with an active front end system in accordance with the invention.

By separating the ripple current handling capacitor from the electrolytic capacitor, it is possible to use the active filter circuit as a standalone structure with its DC output being connected to the VFD DC bus so that the VFD is powered from a regulated DC source. This separation is beneficial in a common DC bus configuration as shown in FIG. 6.

From the discussions put forth above, the summary of the disclosures are as follows. The disclosed circuit is aimed at reducing the ripple across the DC bus capacitor and reducing the peak current flowing through the rectifier diodes. The main idea is based on storing energy in an external inductor and retrieving it at the appropriate time to transfer it to the load in an efficient and optimal manner. The external components used are not very large and can be accommodated within a VFD enclosure. Current feedback is not used as an inner loop for DC bus voltage control. Instead, the current through the switches are monitored and the control angle is suitably modified to limit the high current caused by faulty operation or a saturated inductor due to faulty inductor design. Hence, current feedback is relegated to provide protection rather than DC bus voltage regulation. The size and current rating of the current sensor is significantly reduced and allows easier integration. Due to the way the disclosed circuit works, the spare diode pair available in a three-phase rectifier bridge when used for single-phase AC input, is effectively taken advantage of by connecting it in parallel with the pair of diodes that does not connect to the DC bus midpoint through the bidirectional switch. By separating the filter capacitor from the main DC bus capacitors, a common DC bus application is easy to implement. The DC bus capacitor can be a standard electrolytic capacitor, while the higher ripple current is handled by the AC filter capacitors.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A voltage source inverter comprising:
a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple;
an inverter for receiving DC power from the DC bus and converting the DC power to AC power; and
an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus, wherein the bidirectional switch is turned on starting at a first half of each half wave cycle of the single-phase AC power.

2. The voltage source inverter of claim 1 wherein the bidirectional switch comprises two switches connected in a common emitter or common collector configuration.

3. The voltage source inverter of claim 1 further comprising first and second inductors connected between opposite sides of the AC source and the rectifier.

4. The voltage source inverter of claim 3 wherein the first and second inductors are of equal inductance.

5. The voltage source inverter of claim 1 wherein the DC bus capacitor comprises an electrolytic capacitor and the filter capacitors comprise film capacitors.

6. The voltage source inverter of claim 1 wherein the filter capacitors each are about 10 to 15% of the DC bus capacitor value.

7. A voltage source inverter comprising:
a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple;
first and second inductors connected between opposite sides of the AC source and the rectifier, wherein the first and second inductors are of equal inductance, and wherein the first and second inductors each have an impedance of about 0.1 pu;
an inverter for receiving DC power from the DC bus and converting the DC power to AC power; and
an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus.

8. A voltage source inverter comprising:
a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple;
an inverter for receiving DC power from the DC bus and converting the DC power to AC power; and
an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus,
wherein the rectifier comprises a three-phase rectifier bridge including three pairs of diodes and the bidirectional switch is connected to one pair of diodes of the rectifier bridge and the two other pairs of diodes of the rectifier bridge are shorted at input terminals to provide current sharing between the two other pairs of diodes.

9. A voltage source inverter comprising:
a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple;
an inverter for receiving DC power from the DC bus and converting the DC power to AC power; and
an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus,
wherein the rectifier comprises a three-phase rectifier bridge including three pairs of diodes and the bidirectional switch is connected to one pair of diodes of the rectifier bridge and the two other pairs of diodes of the rectifier bridge are connected in parallel at the first and second rails of the DC bus, to provide current sharing between the two other pairs of diodes.

10. A boost converter comprising:
a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple; and
an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus to provide a regulated DC source, wherein the bidirectional switch is turned on at the start of a first half of each half wave cycle of the single-phase AC power.

11. The boost converter of claim 10 wherein the bidirectional switch comprises two switches connected in a common emitter or common collector configuration.

12. The boost converter of claim 10 further comprising first and second inductors connected between opposite sides of the AC source and the rectifier.

13. The boost converter of claim 12 wherein the first and second inductors are of equal inductance.

14. A boost converter comprising:
- a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple;
- first and second inductors connected between opposite sides of the AC source and the rectifier wherein the first and second inductors are of equal inductance, and wherein the first and second inductors each have an impedance of about 0.1 pu; and
- an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus to provide a regulated DC source.

15. The boost converter of claim 10 wherein the DC bus capacitor comprises an electrolytic capacitor and the filter capacitors comprise film capacitors.

16. The boost converter of claim 10 wherein the filter capacitors each are about 10 to 15% of the DC bus capacitor value.

17. A boost converter comprising:
- a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple; and
- an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus to provide a regulated DC source,
- wherein the rectifier comprises a three-phase rectifier bridge including three pairs of diodes and the bidirectional switch is connected to one pair of diodes of the rectifier bridge and the two other pairs of diodes of the rectifier bridge are shorted at input terminals to provide current sharing between the two other pairs of diodes.

18. A boost converter comprising:
- a rectifier having an input for receiving single-phase AC power from an AC source and converting the AC power to DC power on a DC bus, the DC bus having first and second rails to provide a relatively fixed DC voltage, and a DC bus capacitor across the first and second rails to smooth voltage ripple; and
- an active front end circuit comprising a pair of filter capacitors in series across the first and second rails to create a midpoint, and a bidirectional switch connected between the rectifier input and the midpoint, the bidirectional switch being controlled to inject current into the midpoint of the DC bus to provide a regulated DC source,
- wherein the rectifier comprises a three-phase rectifier bridge including three pairs of diodes and the bidirectional switch is connected to one pair of diodes of the rectifier bridge and the two other pairs of diodes of the rectifier bridge are connected in parallel at the first and second rails of the DC bus, to provide current sharing between the two other pairs of diodes.

* * * * *